(12) United States Patent
Ohmori et al.

(10) Patent No.: US 7,150,637 B2
(45) Date of Patent: Dec. 19, 2006

(54) BATTERY CHAMBER STRUCTURE

(75) Inventors: Toshiyuki Ohmori, Saitama (JP); Hiroshi Orita, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/068,913

(22) Filed: Mar. 2, 2005

(65) Prior Publication Data
US 2005/0197002 A1    Sep. 8, 2005

(30) Foreign Application Priority Data
Mar. 4, 2004    (JP) .............................. 2004-060027

(51) Int. Cl.
*H01R 13/44* (2006.01)
(52) U.S. Cl. ........................ 439/147; 439/500; 439/367
(58) Field of Classification Search ................ 439/500, 439/911, 147, 144, 367, 345, 892–893, 135; 429/97
See application file for complete search history.

(56) References Cited

U.S. PATENT DOCUMENTS 5,801,466 A * 9/1998 Odagiri et al. ................ 340/7.6
6,529,714 B1 * 3/2003 Nakamura et al. .......... 439/500

FOREIGN PATENT DOCUMENTS

JP    07-14563    1/1995

OTHER PUBLICATIONS

English language Abstract of JP07-14563.

* cited by examiner

*Primary Examiner*—Felix O. Figueroa
(74) *Attorney, Agent, or Firm*—Greenblum & Bernstein, P.L.C.

(57) ABSTRACT

A battery chamber structure for an electronic apparatus includes a casing having an opening, through which a battery is inserted into the battery chamber, and a battery chamber lid detachably attached to the opening to close the battery chamber. The battery includes a first connector which is connected to a second connector of the electronic apparatus, the second connector being provided inside the opening. A portion of the battery chamber lid adjacent to the first connector is shaped to mechanically prevent the first connector from being disengaged from the second connector when the battery chamber lid is attached to the opening.

9 Claims, 4 Drawing Sheets

BATTERY CHAMBER STRUCTURE

BACKGROUND OF THE INVENTION

1. Field of the Invention

The present invention relates to an improved battery chamber structure for a small electronic apparatus in which a battery is connected to the electronic apparatus via a connector device such as male and female connectors.

2. Description of the Related Art

One or more batteries are generally used as a power source of a small electronic apparatus such as a mobile electronic device. A large-capacity battery is often provided in the form of a battery pack, having a plurality of cells packed in a single case, and an electrical lead wire (lead wire bundle) having a plug-in connector at its end is drawn from the battery pack so that the battery pack is electrically connected to the electronic apparatus via the connector.

A malfunction may occur in a small electronic device using such a type of battery if the connector of the battery is accidentally disconnected during operation of the electronic device. To prevent this problem from occurring, various technical ideas for preventing the connector of the battery from being accidentally disconnected from an associated connector on the electronic device have been proposed. Mobile electronic devices are quite likely to suffer from vibrations and shock, and accordingly, there is a possibility of the two connectors loosening by continuous vibrations or shock, thus causing a malfunction to occur. For instance, in electronic devices using an IC memory card, the connector of the battery is prevented from being disconnected unless the IC memory card is removed by adopting a mechanism for making the IC memory card and a battery chamber lid engaged mechanically with each other. However, such a mechanical structure cannot be adopted for electronic devices which do not use an IC memory card. An electronic apparatus in which the connector for the battery is provided with a locking mechanism for locking the connector has been proposed. However, this type of locking mechanism tends to make the connector difficult to operate and there is a possibility of the locking mechanism being damaged or the aforementioned electrical lead wire being broken during withdrawal of the connector of the battery.

SUMMARY OF THE INVENTION

The present invention provides an improved battery chamber structure which prevents a connector of a battery from being accidentally loosened and disconnected from an associated connector provided on the electronic apparatus, while allowing the connector of the battery to be easily disconnected when the connector of the battery is intentionally disconnected.

According to the present invention, a battery chamber structure for an electronic apparatus is provided, including a casing having an opening, through which a battery is inserted into the battery chamber, and a battery chamber lid detachably attached to the opening to close the battery chamber. The battery includes a first connector which is connected to a second connector of the electronic apparatus, the second connector being provided inside the opening. A portion of the battery chamber lid adjacent to the first connector, when said first connector is connected to said second connector, is shaped to mechanically prevent the first connector from being disengaged from the second connector when the battery chamber lid is attached to the opening.

It is desirable for the portion of the battery chamber lid to include an engaging member which is engageable with a portion of the casing to fix the battery chamber lid to the casing.

It is desirable for the first connector to be connected to the second connector from a side of the second connector which faces the opening. The engaging member of the battery chamber lid is provided at a position facing the second connector in a state where the battery chamber lid is attached to the opening. In the state where the battery chamber lid is attached to the opening, the engaging member of the battery chamber lid is positioned relative to the first connector by a gap which is formed between the engaging member and a back surface of the first connector, which faces the battery chamber lid, in a disengaging direction of the first connector from the second connector, the gap being smaller than a minimum clearance behind the back surface of the first connector which is necessary for disengaging the first connector from the second connector in the disengaging direction.

It is desirable for the engaging member to be made of a resilient material and be formed to have a substantially U-shaped cross section or a substantially V-shaped cross section. One of opposite ends of the engaging member is provided as a free end so that the engaging member is resiliently deformable. The engaging member includes a hook portion which is formed in a vicinity of the free end to be engageable with an edge of the casing in the opening. A crest of the engaging member, which is positioned closer to the back surface of the first connector than any other part of the engaging member, is positioned to face the back surface of the first connector when the battery chamber lid is attached to the opening.

It is desirable for the battery to be provided as a battery pack including a plurality of cells.

It is desirable for the first connector to be fixed to an end of an electrical cord which is drawn from the inside of the battery pack.

The electronic apparatus can be a mobile electronic apparatus.

In an embodiment, an electronic apparatus using a battery as a power source is provided, the battery being accommodated in a battery chamber through an opening formed on a casing of the electronic apparatus, a battery chamber lid being attached to the opening to close the battery chamber, wherein the electronic apparatus includes a fixed connector, positioned inside the opening, for establishing electrical connection to the battery pack; the battery includes a battery connector which is connected to the fixed connector to establish the electrical connection, and the battery chamber lid includes a dual-purpose member for attaching the battery chamber lid to the opening to close the battery chamber and for preventing the battery connector from being disengaged from the fixed connector when the battery chamber lid is attached to the opening.

It is desirable for the dual-purpose member to include a resiliently-deformable engaging member which is resiliently engaged with a portion of the casing at the opening when the battery chamber lid is attached to the opening to close the battery chamber.

According to the present invention, the connector of the battery only needs to be connected to the connector on the electronic apparatus upon the connector of the battery being connected to the connector on the electronic apparatus, and the connector of the battery only needs to be pulled out of the connector on the electronic apparatus when the connector of the battery is disconnected from the connector on the electronic apparatus, which makes it easier for the connector of the battery to be connected to and disconnected from the connector on the electronic apparatus. On the other hand, in a state where the connector of the battery is connected to the connector on the electronic apparatus with the battery chamber being closed by the battery chamber lid, the battery chamber lid is associated with the connector of the battery to prevent the connector of the battery from being disconnected from the connector on the electronic apparatus, thus being capable of maintaining the engagement of the two connectors during operation of the electronic apparatus.

The present disclosure relates to subject matter contained in Japanese Patent Application No.2004-060027 (filed on Mar. 4, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
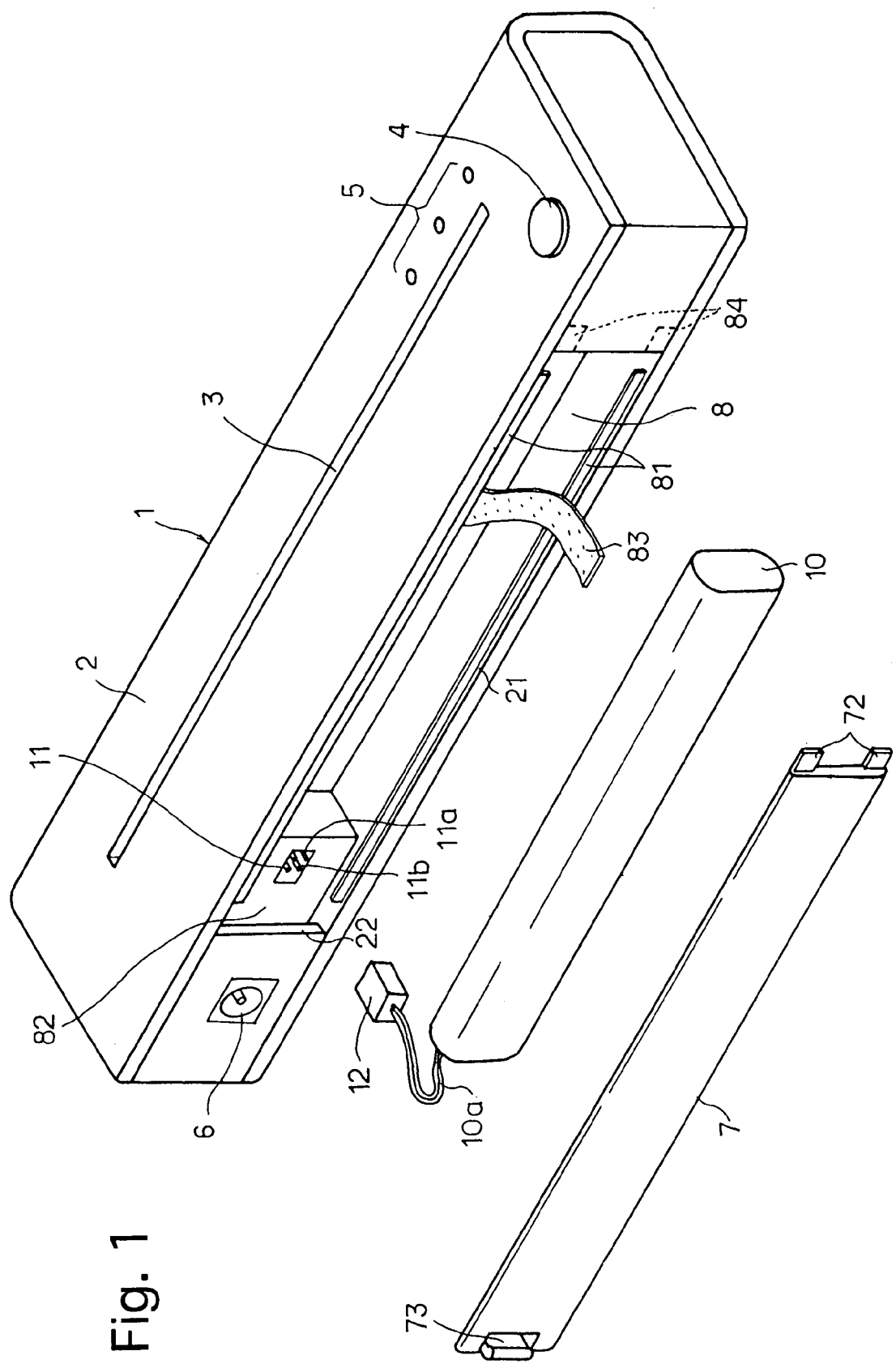
FIG. 1 is a perspective view of an embodiment of a mobile printer as an electronic apparatus according to the present invention.

FIG. 1 shows an embodiment of a thermal-transfer mobile printer (printer 1) as an electronic apparatus according to the present invention. The printer 1 is provided on the back of a casing 2 thereof with an elongated rectangular opening 21 which is elongated in the lengthwise direction of the printer 1, and a battery chamber 8 is formed in the opening 21. The printer 1 is provided with a battery chamber lid 7 which is detachably attached to the opening 21 to close the battery chamber 8. The printer 1 is provided, on an internal wall portion 82 thereof in the battery chamber 8, with a female connector (receptacle connector) 11 which is composed of a socket (recessed portion having a rectangular opening) 11a formed integral with the internal wall portion 82, and a plurality of terminal contacts 11b which are positioned inside the socket 11a. A battery pack 10 is designed specifically for the printer 1, and is accommodated in the battery chamber 8. The battery pack 10 includes, e.g., six rechargeable AA cells connected in series which are packed in a single unit as shown in FIG. 1. A lead wire (two-wire cord) 10a is drawn from the battery pack 10, and a male connector (plug connector) 12 which is plugged into the female connector 11 is fixed at the end of the lead wire 10a. The female connector 11 and the male connector 12 constitute a connector device for the battery pack 10. The battery pack 10 is accommodated in the battery chamber 8 after the male connector 12 is plugged into the female connector 11 to establish electrical connection between the lead wire 10a and the terminal contacts 11b, and thereafter the battery chamber lid 7 is attached to the opening 21 to close the battery chamber 8.

The printer 1 is provided on an upper surface and a front surface thereof with a paper insertion slit 3 and a paper eject slit (not shown), respectively, so that characters or images are thermally printed on a piece of heat-sensitive paper which is inserted into the printer 1 through the paper insertion slit 3, and so that the printed piece of heat-sensitive paper is ejected from the paper eject slit. The printer 1 is provided on an upper surface thereof with a plurality of LEDs 5 for indicating the operating status of the main switch and the operating status of the printer 1. The printer 1 is provided on a back surface thereof with an AC adapter socket 6 for connecting the printer 1 to an external power source (not shown). The battery chamber 8 that is covered by the battery chamber lid 7 is elongated over almost the entire area of the back surface of the printer 1 except for the area of the back surface in which the AC adapter socket 6 is provided.

The battery chamber 8 is formed as a recess in the elongated rectangular opening 21 on the back of the casing 2 to be capable of fully accommodating the specially designed battery pack 10. The casing 2 is provided, on upper and lower inner surfaces of the casing 2 in the battery chamber 8, with a pair of narrow-width inner support rails 81, respectively, which project toward each other, face the opening 21, and are elongated in the lengthwise direction of the printer 1. The internal wall portion 82 is provided in the battery chamber 8 at one of opposite ends thereof in the lengthwise direction of the battery chamber 8, and is in the vicinity of the rear side of the printer 1, while the female connector 11 is formed on the internal wall portion 82. The printer 1 is provided, in the battery chamber 8 at a position closer to the other of opposite ends thereof (i.e., at the opposite end with respect to the internal wall portion 82) in the lengthwise direction of the battery chamber 8, with a cloth pull-out ribbon 83 for pulling out the battery pack 10 from the battery chamber 8, one end of the pull-out ribbon 83 being fixed to an internal wall of the battery chamber.

Figure 2A:
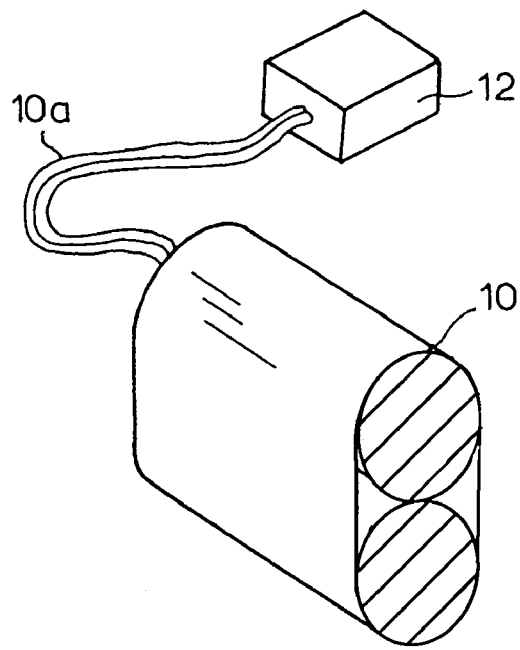
FIG. 2A is a perspective view of a portion of a battery pack shown in FIG. 1.
Figure 2B:
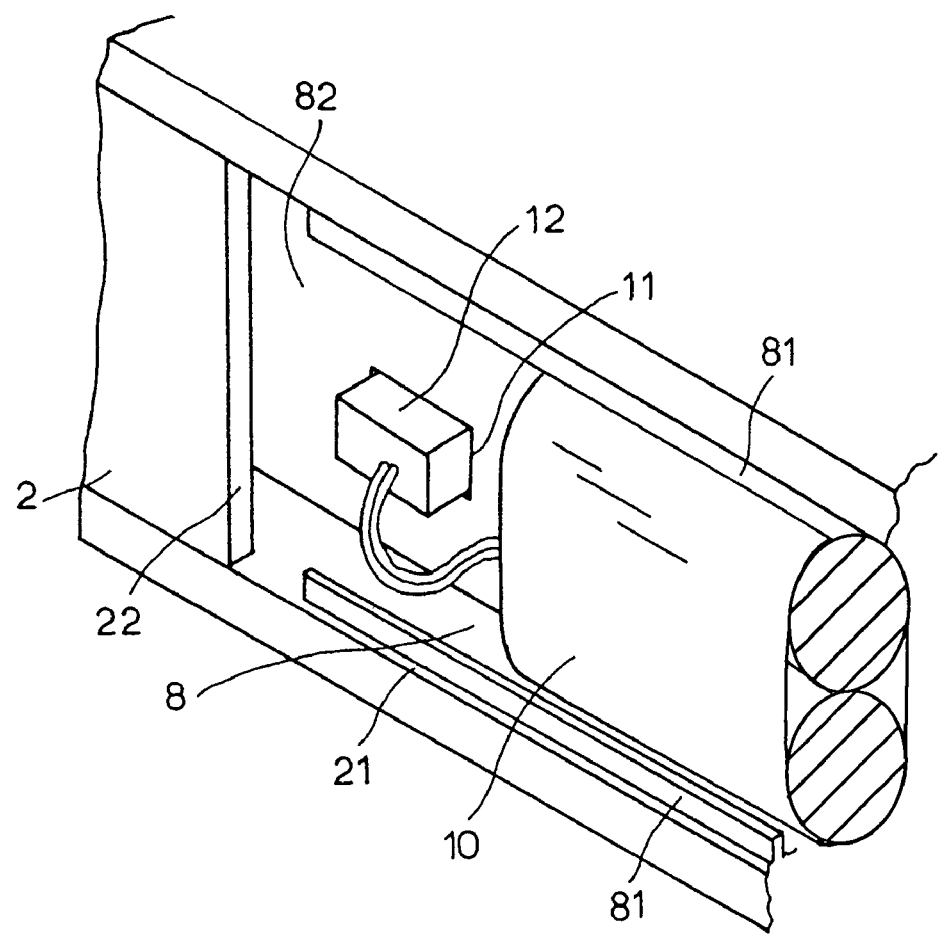
FIG. 2B is a portion of the mobile printer shown in FIG. 1 in a state where the battery pack is accommodated in a battery chamber of the electronic apparatus.

The battery pack 10 includes six rechargeable AA cells connected in series which are arranged in two rows each having three AA cells placed in a line, and all the six AA cells arranged in this manner are packed by a plastic sheet. As shown in FIGS. 2A and 2B, the lead wire 10a includes two lead wires (positive and negative lead wires), and the male connector 12 is fixed at the free end of the lead wire 10a. As shown in FIG. 2B, the male connector 12 is formed in a small box which is capable of being fitted into the socket 11a of the female connector 11. The male connector 12 is provided with a plurality of terminal contacts (not shown) which are fitted on or in contact with the plurality of terminal contacts 11b of the female connector 11 to establish electrical connection between the terminal contacts 11b with the lead wire 10a when the male connector 12 is plugged into the socket 11a.

Figure 3A:
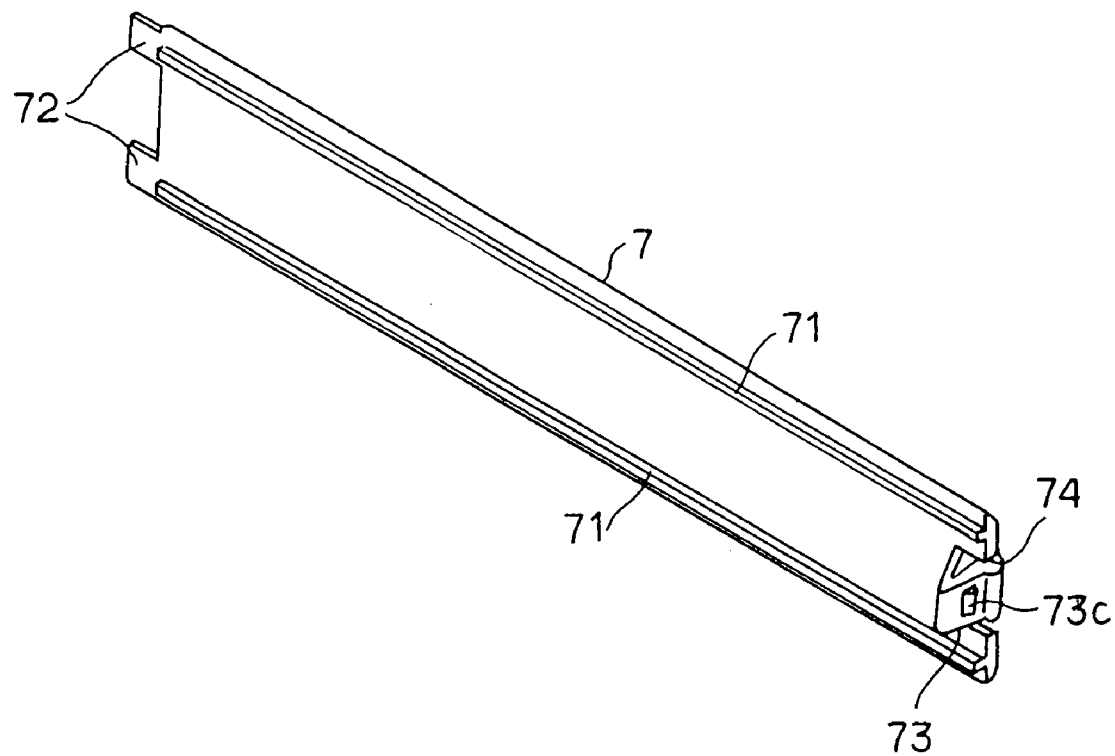
FIG. 3A is a perspective view of the battery chamber lid shown in FIG. 1.
Figure 3B:
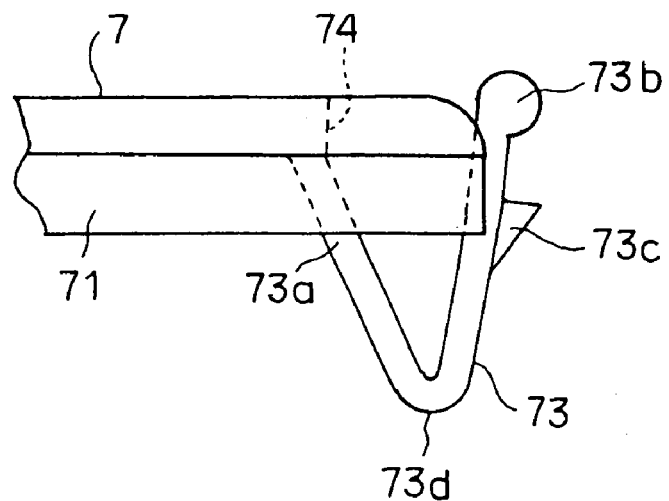
FIG. 3B is a side elevational view of a portion of the battery chamber lid shown in FIG. 3A.

FIG. 3A is a perspective view of the battery chamber lid 7, viewed from the inner side thereof. The battery chamber lid 7 is formed as a substantially rectangular plate which is substantially the same as the opening 21 of the casing 2 in shape and size. The battery chamber lid 7 is provided, on both sides of an inner surface thereof along the lengthwise direction of the battery chamber lid 7, with a pair of support rails 71 which come in contact with inner edges of the pair of inner support rails 81 of the casing 2 when the battery chamber lid 7 is attached to the opening 21. The battery chamber lid 7 is provided, at one of the opposite ends in the lengthwise direction of the battery chamber lid 7, with an engaging member (dual-purpose member) 73 having a substantially V-shaped cross section. The engaging member 73 can alternatively have a U-shaped cross section. The engaging member 73 is made of a resilient material, and is resiliently engaged with an associated edge 22 of the casing 2 in the opening 21 when the battery chamber lid 7 is fixed to the opening 21 to close the battery chamber 8. As shown in FIG. 3B, a fixed end 73a of the engaging member 73 is integral with an inner surface of the battery chamber lid 7, while a free end 73a of the engaging member 73 is positioned in a cutout portion 74 formed at the same end (right end as viewed in FIG. 3A) of the battery chamber lid The engaging member 73 is provided, on an outer surface thereof in the vicinity of the free end 73b of the engaging member 73, with a sawtooth lug (hook portion) 73c which is engageable with the edge 22 of the casing 2 from the inner side of the opening 21. The battery chamber lid 7 is provided, at the other end thereof in the lengthwise direction of the battery chamber lid 7, with a pair of engaging projections 72 which are engaged in a corresponding pair of engaging recesses 84 (see FIG. 1) formed on an inner surface of the casing 2 at the corresponding end of the battery chamber 8, when the battery chamber lid 7 is attached to the opening 21 in order to close the battery chamber 8.

Figure 4A:
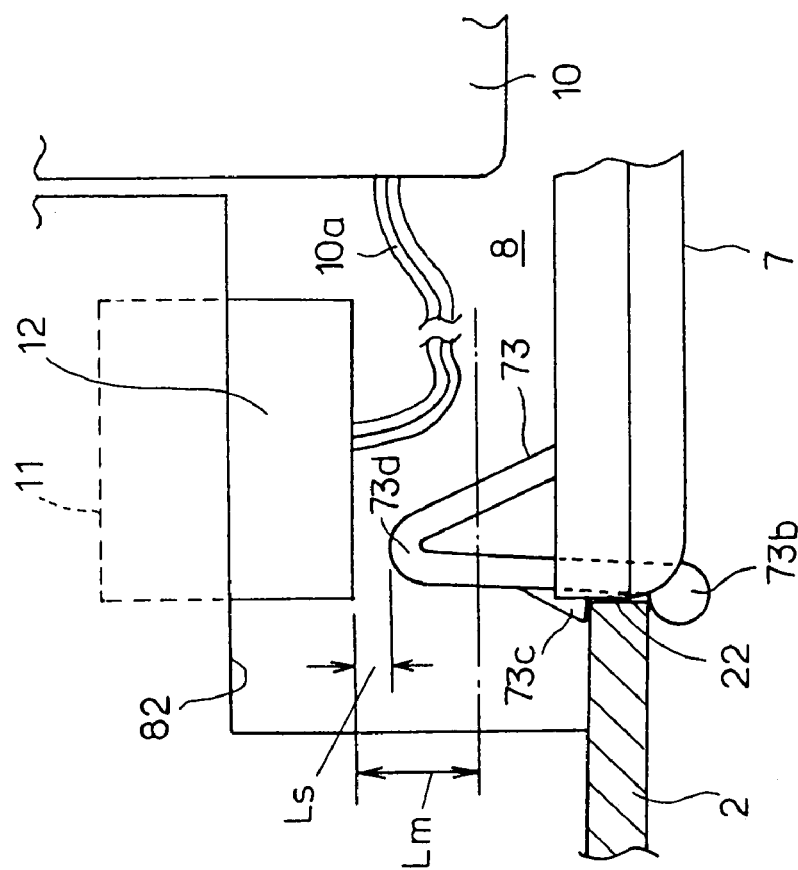
FIG. 4A is a cross sectional view of a portion of the electronic apparatus shown in FIG. 1, showing a positional relationship between the connector of the battery and a locking member.

FIG. 4A shows a state where the battery pack 10 is accommodated in the battery chamber 8 with the male connector 12 of the battery pack 10 being firmly engaged in the female connector 11 in the battery chamber 8 while the battery chamber lid 7 is attached to the casing 2. The engaging member 73 is formed on the battery chamber lid 7 so that a crest 73d of the engaging member 73 faces the male connector 12 (or the female connector 11 in the case where the male connector 12 is not engaged in the female connector 11) when the battery chamber lid 7 is attached to the opening 21 to close the battery chamber In other words, the female connector 11 is provided at a position in the battery chamber 8 away from the edge 22 of the casing 2 by a slight distance in the lengthwise direction of the battery chamber 8. The height of the crest 73d of the engaging member 73 (the amount of projection of the engaging member 73) is determined so that the crest 73d is positioned in the vicinity of the male connector 12 with a predetermined gap Ls (see FIG. 4A) being formed between the crest 73d and a back surface (bottom surface as viewed in FIG. 4A) of the male connector 12 which is properly (fully) plugged into the female connector 11 in a state where the battery chamber lid 7 is properly attached to the opening 21 to close the battery chamber 8. More specifically, in a state where the male connector 12 is firmly plugged into the female connector 11, the gap Ls is determined to be smaller than a minimum clearance Lm (see FIG. 4A) behind the male connector 12 which is necessary for the male connector 12 to be pulled out from the female connector 11.

When the battery chamber lid 7 is attached to the opening 21 to close the battery chamber 8, the pair of engaging projections 72 is firstly engaged in the pair of engaging recesses 84. At this stage, the opposite ends (upper and lower ends as viewed in FIG. 3A) of the battery chamber lid 7 in the lateral direction thereof are supported by the pair of inner support rails 81 by bringing the pair of guide rails 71 of the battery chamber lid 7 into contact with inner edges of the pair of inner support rails 81 in the battery chamber 8. Subsequently, the engaging member 73 is engaged with the associated edge 22 of the casing 2 in the opening 21. When the engaging member 73 is engaged with the associated edge 22 of the casing 2, the engaging member 73 is first inserted into the opening 21 while being resiliently deformed in a manner to reduce a V-shaped internal gap of the engaging member 73, and subsequently the engaging member 73 returns to its original shape to thereby cause the sawtooth lug 73c to be engaged with the edge 22 of the casing 2. This engagement of the sawtooth lug 73c with the edge 22 of the casing 2 prevents the battery chamber lid 7 which is attached to the opening 21 from being accidentally disengaged therefrom.

Therefore, when the battery pack 10 is inserted into the battery chamber 8, the male connector 12 of the battery pack 10 is plugged into the female connector 11 with the battery chamber lid 7 being removed. At this stage, the male connector 12 can be easily plugged into the female connector 11 to establish electrical connection between the male connector 12 and the female connector 11 because the male connector 12 is not provided with any conventional locking member such as a locking hook or lug for maintaining the engagement between the male connector 12 and the female connector 11. Subsequently, the battery pack 10 is fitted into the battery chamber 8 to be accommodated therein while the lead wire 10a is bent appropriately. Thereafter, the pair of engaging projections 72 are respectively engaged in the pair of engaging recesses 84 while the engaging member 73 is engaged with the edge 22 of the casing 2 to attach the battery chamber lid 7 to the opening 21 to thereby close the battery chamber 8. This completes the battery-pack accommodating operation.

Figure 4B:
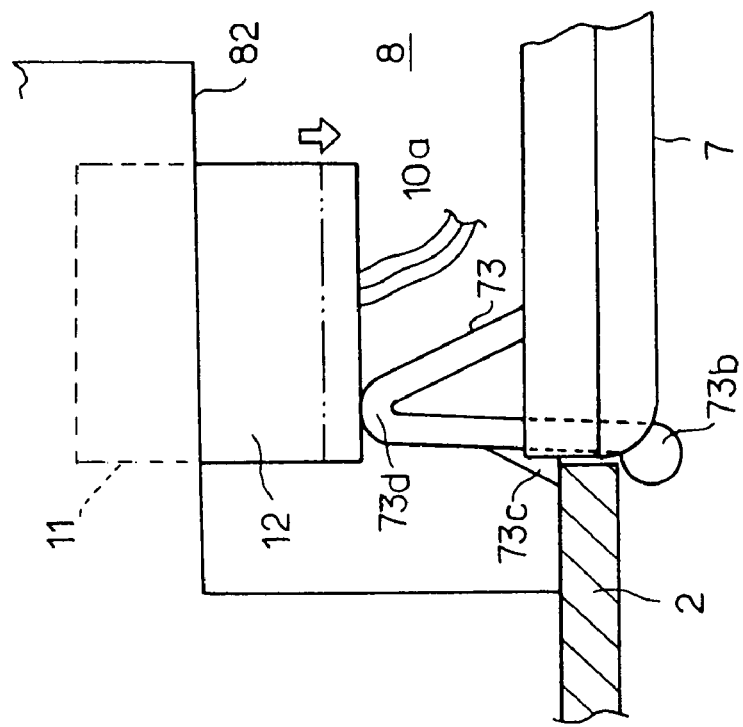
FIG. 4B is a view similar to that of FIG. 4A and illustrates the same portion of the electronic apparatus shown in FIG. 4A in a different state.

In a state where the battery pack 10 is properly accommodated in the battery chamber 8 in the above described manner, the crest 73d is positioned in the close vicinity of the back surface of the male connector 12 as shown in FIG. 4A. Therefore, even if an external force is applied to the male connector 12 in a disengaging direction thereof away from the female connector 11 (downwards as viewed in FIG. 4A) to cause the male connector 12 to disengage from the female connector 11 due to vibrations or shock which may be exerted on the printer 1, the male connector 12 is securely prevented from being mechanically disengaged from the female connector 11 because the back surface of the male connector 12 immediately abuts against the crest 73d of the engaging member 73 to thereby prevent a further movement of the male connector 12 in the disengaging direction thereof, as shown in FIG. 4B. Consequently, the engaging member 73 prevents the male connector 12 from being disengaged from the female connector 12.

When the battery chamber lid 7 is removed the sawtooth lug 73c of the engaging member 73 is disengaged from the edge 22 of the casing 22 by manually leaning the free end 73c of the engaging member 73 in a direction (leftward as viewed in FIG. 3B) to reduce the aforementioned V-shaped internal gap of the engaging member 73 while resiliently deforming the engaging member 73. The battery chamber lid 7 can be detached from the opening 21 upon the disengagement of the sawtooth lug 73c from the edge 22 of the casing 22. After this detachment of the battery chamber lid 7, the engaging member 73 no longer exists behind the male connector 12 of the battery pack 10, and consequently, the male connector 12 can be disconnected from the female connector 11 by simply pulling the male connector 12 out of the female connector 11 after the battery pack 10 is removed from the battery chamber 8 by pulling the pull-out ribbon 83. At this time, it is possible that the male connector 12 be pulled out of the female connector 11 with the body of the battery pack 10 remaining accommodated in the battery chamber 8.

As can be understood from the above description, only the male connector 12 has to be fitted into the female connector 11 when the male connector 12 is connected to the female connector 11, while only the male connector 12 has to be pulled out of the female connector 11 when the male connector 12 is disconnected from the female connector 11. Accordingly, it is easy for the male connector 12 to be engaged with and disengaged from the female connector 11 even if the internal space of the battery chamber 8 is limited (small). Moreover, even though the battery chamber lid 7 is simply attached to the opening 21 to close the battery chamber 8 after the battery pack 10 is accommodated in the battery chamber 8, the male connector 12 is securely prevented from being accidentally disengaged from the female connector 11 due to the position of the engaging 73 of the battery chamber lid 7. Consequently, the male connector 12 of the battery pack 10 is not accidentally disengaged from the female connector 11 by vibrations or shock which may be exerted on the printer 1 during operation of the printer 1.

It is possible for the male connector 12 to be prevented from being disengaged from the female connector 11 without the use of the battery chamber lid 7 if the battery chamber lid 7 is provided on a back surface thereof with an engaging projection (designed specially for preventing the male connector 12 from being accidentally disengaged from the female connector 11) which is positioned immediately behind the back surface of the male connector 12 when the battery chamber lid 7 is attached to the opening 21. Nevertheless, since such an engaging projection does not have to be provided in addition to the engaging member 73 in the above described embodiment of the mobile printer, the above described embodiment of the mobile printer is advantageous for reducing in the number of elements of the printer 1, and the male connector 12 can be prevented from being accidentally disengaged from the female connector 11, due to vibrations or shock which may be exerted on the printer 1, if dimensions and configurations of the male connector 11 and the female connector 12 relative to the engaging member 73 are appropriately determined.

Although the battery chamber lid 7 and the casing 2 are provided as separate members in the above described embodiment of the mobile printer, it is easily understood by those skilled in the art that the present invention can be applied to a structure of the battery chamber in which the battery chamber lid is hinged on the casing.

Although the printer 1 is provided with the female connector 11 while the battery pack 10 is provided with the male connector 12 in the above illustrated embodiment of the mobile printer, the printer 1 can be provided with a male connector which projects from the internal wall portion 82 while the battery pack 10 can be provided with a female connector which is fixed to the end of the lead wire 10a to be capable of being fitted on the male connector. In this case, the crest 73d of the engaging member 73 is positioned immediately behind the back surface of the female connector when the battery chamber lid is attached to the opening 21 to close the battery chamber 8.

The prevent invention is not limited solely to a printer such as the above described embodiment of the mobile printer, but also to other types of electronic apparatuses which use a battery as a power source that includes a connector.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A battery chamber structure for an electronic apparatus, comprising:
    a casing having an opening, through which a battery is inserted into a battery chamber; and
    a battery chamber lid detachably attached to said opening to close said battery chamber,
    wherein said battery includes a first connector which connects to a second connector of said electronic apparatus, said second connector being provided inside said opening, said first connector connecting to a side of said second connector which faces said opening,
    a portion of said battery chamber lid adjacent to said first connector, when said first connector is connected to said second connector, is shaped to mechanically prevent said first connector from disengaging from said second connector when said battery chamber lid is attached to said opening, and
    said portion of said battery chamber lid comprises an engager which is engageable with a portion of said casing to fix said battery chamber lid to said casing, said engager facing said second connector when said battery chamber lid attaches to said opening, a gap being formed between said engager and a back surface of the first connector which faces said battery chamber lid in a disengaging direction in which said first connector disengages from said second connector, when said battery chamber lid attaches to said opening, said gap being smaller than a minimum clearance behind said back surface of said first connector which is necessary for disengaging said first connector from said second connector in said disengaging direction, wherein said engager has one of a substantially U-shaped cross section and a substantially V-shaped cross section, and comprises a crest which abuts the back surface of the first connector to prevent disengagement.

2. The battery chamber structure according to claim 1, wherein said engager comprises a resilient material and comprises:
    a free end which allows the engager to be resiliently deformable, and
    a hook portion, formed in a vicinity of said free end, and configured to engage an edge of said casing in said opening, and
    the crest is positioned closer to said back surface of said first connector than any other part of said engager, and is positioned to face said back surface of said first connector when said battery chamber lid is attached to said opening.

3. The battery chamber structure according to claim 1, wherein said battery comprises a battery pack including a plurality of cells.

4. The battery chamber structure according to claim 1, wherein said first connector is fixed to an end of an electrical cord which is drawn from an inside of said battery.

5. The battery chamber structure according to claim 1, wherein said electronic apparatus is a mobile electronic apparatus.

6. A battery chamber structure for an electronic apparatus, comprising:
    a casing defining a battery chamber, said casing having an opening through which a battery can be inserted;

a battery connector, provided in said battery chamber, and configured to connect to an electronic apparatus connector of a battery pack, said battery pack comprising a lead wire extending from a battery of the battery pack, the electronic apparatus connector being connected to an end of the lead wire; and a battery chamber lid detachably attached to said opening to close said battery chamber, said battery chamber lid comprising an engager which prevents said battery connector from disengaging from said electronic apparatus connector when said battery chamber lid is attached to said opening, said engager having one of a substantially U-shaped cross section and a substantially V-shaped cross section, and comprising a crest portion which abuts a back surface of the electronic apparatus connector to prevent disengagement.

7. The battery chamber structure according to claim 6, wherein said engager is positioned across from said battery connector when said battery chamber lid is attached to said opening, and a gap is formed between said engager and said battery connector when said battery chamber lid is attached to said opening, said gap being smaller than a minimum clearance necessary to disengage said electronic apparatus connector from said battery connector.

8. The battery chamber structure according to claim 6, wherein said crest portion is positioned across from said battery connector when said battery chamber lid is attached to said opening.

9. The battery chamber structure according to claim 6, wherein said engager comprises a hook portion which holds said battery chamber lid to said casing.

* * * * *